(12) United States Patent
Krishnamurthy et al.

(10) Patent No.: US 8,804,696 B1
(45) Date of Patent: Aug. 12, 2014

(54) INTEGRATED GATEWAY

(75) Inventors: Udhayakumar Krishnamurthy, Parlin, NJ (US); Abdulla Udaipurwala, Parlin, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1838 days.

(21) Appl. No.: 11/593,753

(22) Filed: Nov. 7, 2006

(51) Int. Cl.
*H04W 88/06* (2009.01)
*H04L 12/66* (2006.01)
*H04L 29/06* (2006.01)

(52) U.S. Cl.
CPC .............. *H04W 88/06* (2013.01); *H04L 12/66* (2013.01); *H04L 65/1013* (2013.01); *H04L 65/1059* (2013.01)
USPC ......................................................... 370/352

(58) Field of Classification Search
CPC ... H04W 88/06; H04L 12/66; H04L 65/1013; H04L 65/1059
See application file for complete search history.

(56) References Cited

U.S. PATENT DOCUMENTS

| H2187 H * | 4/2007 | Yuchimuk ...................... 704/246 |
| 8,498,294 B1 * | 7/2013 | Monk et al. ................... 370/392 |
| 2003/0137985 A1 * | 7/2003 | Koyanagi et al. ............. 370/401 |
| 2004/0220810 A1 * | 11/2004 | Leask et al. ................ 704/270.1 |
| 2006/0072546 A1 * | 4/2006 | Chen ............................. 370/352 |
| 2006/0161960 A1 * | 7/2006 | Benoit .......................... 725/105 |
| 2006/0209856 A1 * | 9/2006 | Tojo et al. ..................... 370/401 |

* cited by examiner

*Primary Examiner* — Luat Phung

(57) ABSTRACT

An integrated gateway is disclosed. In one embodiment, a gateway includes a modem, a wide area network (WAN) interface, a local area network (LAN) interface, a router module, a voice-over-internet protocol (VOIP) adapter and a session-initiation protocol (SIP) adapter. The WAN interface is in communication with a packet network, such as a VOIP network. The router module is configured to route data traffic between the WAN interface and the LAN interface. In one embodiment, the VOIP adapter, as does the SIP adapter, includes a wireless interface for wireless communication with an endpoint device. The VOIP adapter is configured to provide VOIP services between the endpoint device and the packet network. The SIP adapter is configured to provide SIP services between the endpoint device and the packet network.

14 Claims, 4 Drawing Sheets

INTEGRATED GATEWAY

BACKGROUND OF THE INVENTION

1. Field of the Invention

Embodiments of the present invention generally relate to telecommunications systems and, more particularly, to an integrated gateway that includes voice-over internet protocol (VoIP) adapter and session-initiation protocol (SIP) adapter.

2. Description of the Related Art

Voice over internet protocol (VoIP) is becoming an ever more popular alternative to traditional telecommunications such as plain old telephone system (POTS) or Public Switched Telephone Networks (PSTN). Generally, VoIP services are cheaper than equivalent service from traditional telecommunications, such as POTS or PSTN. However, these cost savings may be absorbed by the current cost of equipment needed to install VoIP services in a subscriber's home. Current VoIP services require a multitude of components and equipment such as a DSL or cable modem and an analog wireless phone with a wireless base all connected to a broadband router and phone adapter. Moreover, if the subscriber wishes to connect PCs to the broadband router and phone adapter, a router/hub/switch may also be necessary. An additional problem with requiring numerous components is the complexity of installing and connecting all the individual components. Finally, expensive wiring may need to be installed or wiring changes may need to be made in the home to use VoIP services from all parts of the home, reducing the cost advantages of VoIP services even more.

Therefore, a need exists for an integrated Gateway.

SUMMARY OF THE INVENTION

Integrated gateway is described. In one embodiment, a gateway includes a modem, a wide area network (WAN) interface, a local area network (LAN) interface, a router module, a voice-over-internet protocol (VOIP) adapter and a session-initiation protocol (SIP) adapter. The WAN interface is in communication with a packet network, such as a VOIP network. The router module is configured to route data traffic between the WAN interface and the LAN interface. In one embodiment the VOIP adapter, as does the SIP adapter, includes a wireless interface for wireless communication with an endpoint device. The VOIP adapter is configured to provide VOIP services between the endpoint device and the packet network. The SIP adapter is configured to provide services, e.g., SIP communications, between one or more endpoint devices and the packet network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
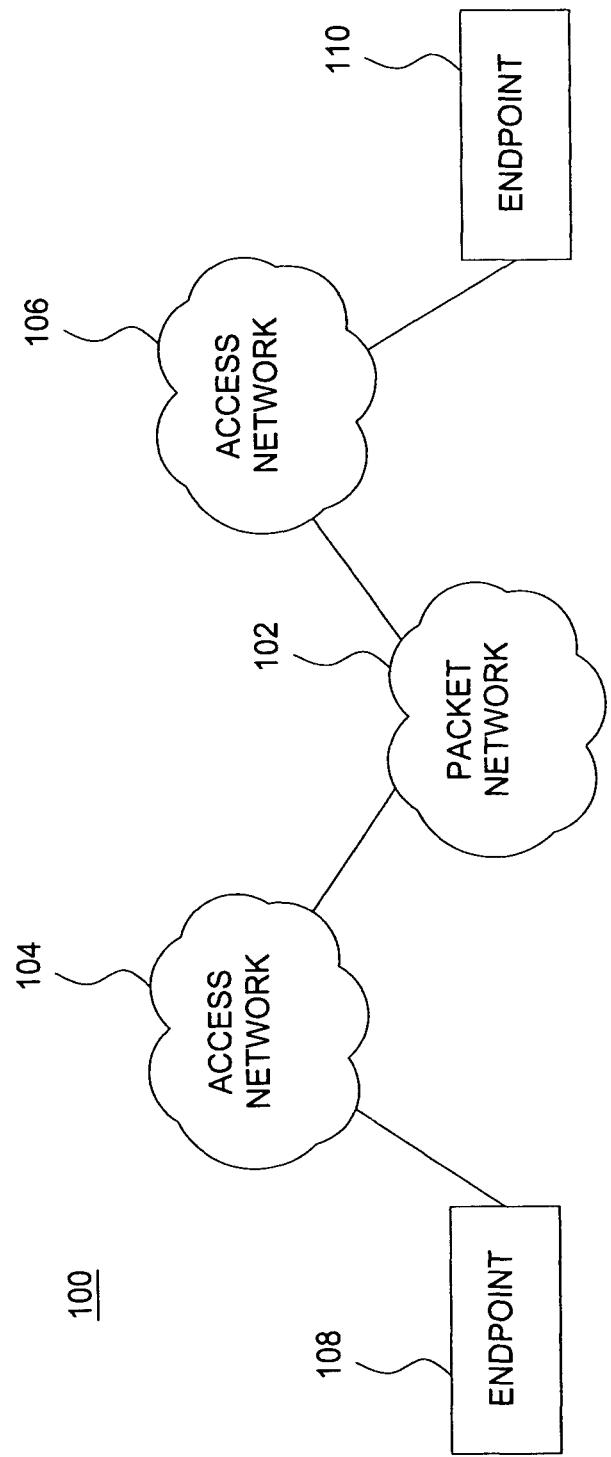
FIG. 1 is a block diagram depicting an exemplary embodiment of a communication system with which the present invention may be utilized.

FIG. 1 is a block diagram depicting an exemplary embodiment of a communication system 100 with which the present invention may be utilized. The communication system 100 illustratively includes a packet network 102, access networks 104 and 106, and endpoints (or broadly endpoint devices) 108 and 110.

The packet network 102 may comprise one or more of an internet protocol (IP) network, asynchronous transfer mode (ATM) network, frame relay network, and the like. A packet network is broadly defined as a network that uses a protocol, such as IP, to exchange data packets. Thus, a voice-over-internet protocol (VOIP) network, or a SOIP (Service over Internet protocol) network is considered a packet network. In one embodiment, the packet network 102 may include an Internet Protocol/Multi-Protocol Label Switching (IP/MPLS) based core backbone network for supported VOIP services. Broadly defined, a VoIP network is a network that is capable of carrying voice signals as packetized data over an IP network. Although the present invention is described below in the context of an illustrative VoIP network, the present invention should not be interpreted to be limited by this particular illustrative architecture.

In one embodiment, the endpoint 108 is configured for communication with the packet network 102 via the access network 104. The endpoint 110 is configured for communication with the packet network 102 via the access network 106. Each of the access networks 104 and 106 may be a digital subscriber line (DSL) access network, a cable access network, or like type access network known in the art. The endpoints 108 and 110 are configured for VOIP (or SOIP) communication through the packet network 102. Although only two endpoints and access networks are shown by way of example, the packet network 102 typically supports many more of such endpoints and access networks in practice.

Figure 2:
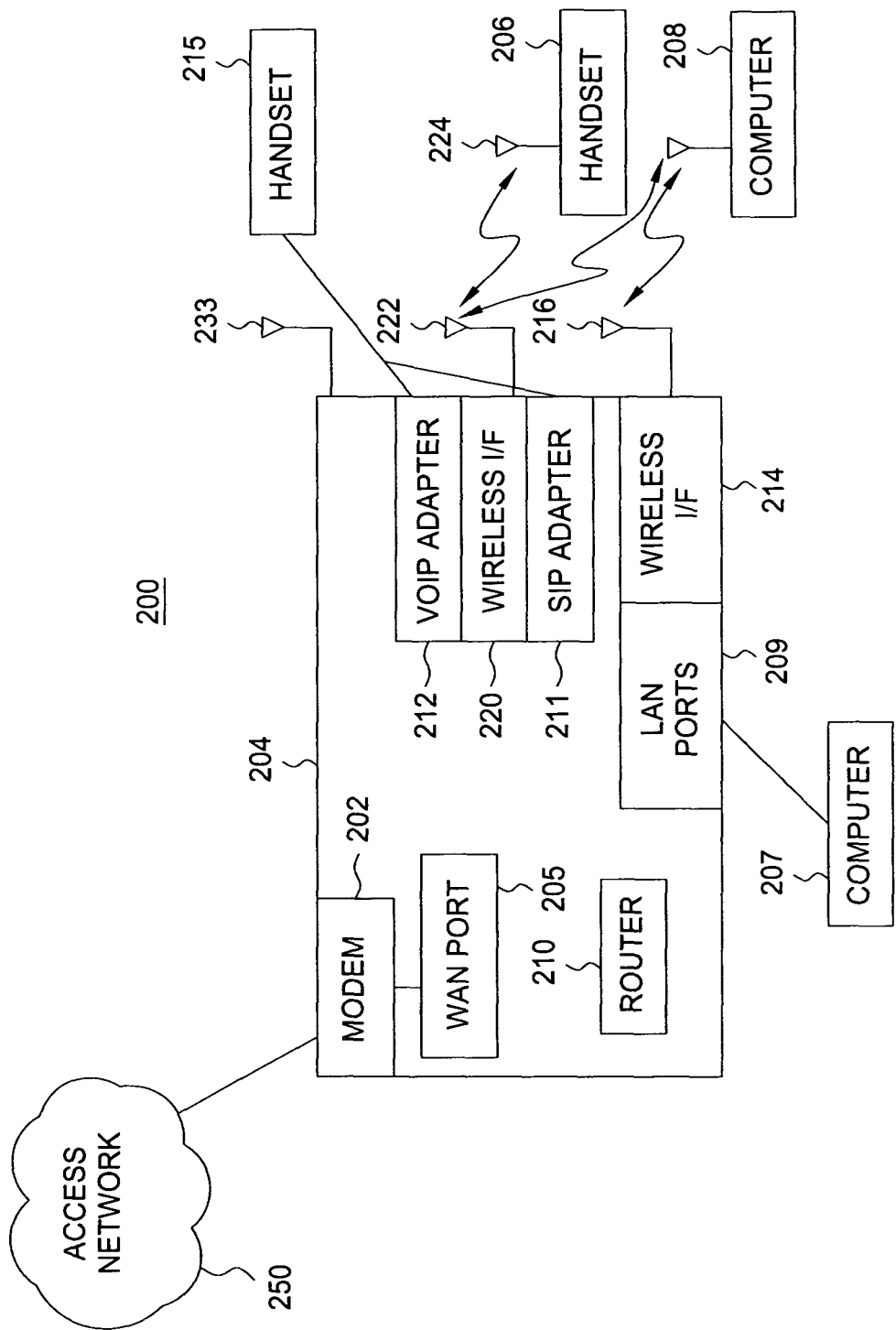
FIG. 2 is a block diagram depicting an exemplary embodiment of an endpoint system for communication with the packet network of FIG. 1 in accordance with one or more aspects of the invention.

FIG. 2 is a block diagram depicting an exemplary embodiment of an endpoint system 200 for communication with the packet network 102 of FIG. 1 in accordance with one or more aspects of the invention. Either or both of the endpoints 108 and 110 may be implemented using the endpoint system 200. The endpoint system 200 includes a gateway 204, handsets 206 and 215, and computers 207 and 208 (both handsets and computers are broadly defined as endpoint devices). In one embodiment, the gateway 204 includes a modem 202, a wide area network (WAN) port 205, a router module 210, a VOIP adapter 212, a SIP adapter 211 and one or more local area network (LAN) ports 209 (collectively referred to as LAN port 209). The modem 202 is configured to provide an interface to an access network 250. For example, the modem 202 may comprise a DSL modem, cable modem, or the like. As is well known in the art, the modem 202 is configured to modulate and demodulate signals in accordance with the particular access technology of the access network 250.

In one embodiment, the modem 202 is integrated within the gateway 204 and is coupled to the WAN port 205 of the gateway 204. The LAN port 209 is configured to communication with various client devices, such as the computer 207 and the computer 208. In one embodiment, the LAN port 209 includes a wireless interface 214 coupled to an antenna 216.

The wireless interface 214 is configured to provide wireless LAN (WLAN) service to client devices, such as the computer 208. For example, the wireless interface 214 may provide IEEE 802.11a, b, and/or g, and like type WLAN service. In one embodiment, the computer 207 is coupled to the LAN port 209 via a wired connection. In either case, the gateway 204 facilitates communication between the computers 207 and 208 coupled to the LAN port 209 and the modem 202 coupled to the WAN port 205. The router module 210 is configured to provide routing services to devices coupled to the LAN port 209. The router module 210 is configured to provide a junction between a WAN coupled to the access network 250 (e.g., the Internet) and the LAN formed by the devices coupled to the LAN port 209. As is well known in the art, the router module 210 facilitates communication of logically address packets between devices on the LAN and hosts on the WAN.

In accordance with one embodiment of the invention, the VOIP adapter 212 is integrated within the gateway 204. The VOIP adapter 212 is configured to provide the VOIP services to the handset 206 and handset 215. Such VOIP services include, for example, originating and terminating VOIP calls, including handling call setup and breakdown, as well as various other types of VOIP features, such as call waiting, call forwarding, and the like known in the art. The VOIP adapter 212 is configured to send and receive VOIP communications via the WAN port 205 of the gateway 204. In one embodiment, the VOIP adapter 212 includes a wireless interface 220 having an antenna 222. For example, the wireless interface 220 may comprise a BLUETOOTH, IEEE 802.11, or like type wireless interface. The handset 206 includes an antenna 224. The handset 206 interacts with the VOIP adapter 212 to obtain VOIP services via wireless communication with the wireless interface 220.

In accordance with one embodiment of the invention, the SIP adapter 211 is integrated within the gateway 204. The SIP adapter 211 is configured to provide the SIP services to the handset 206 and handset 215. Such SIP services include, for example, setting up or tearing down voice or video calls, including handling call setup and breakdown, as well as various other types of SIP features, such as session initiation for any application where needed, Instant messaging (IM) and Presence, and the like known in the art. The SIP adapter 211 is configured to send and receive SIP communications, as well as any other protocol communications that it relies on (RTP, for example), via the WAN port 205 of the gateway 204. In one embodiment, the SIP adapter 211 includes a wireless interface 220 having an antenna 222. For example, the wireless interface 220 may comprise a BLUETOOTH, IEEE 802.11, or like type wireless interface. The handset 206 includes an antenna 224. The handset 206 interacts with the SIP adapter 211 to obtain SIP services via wireless communication with the wireless interface 220.

Both the VOIP 212 adapter and the SIP adapter 211 can communicate with handset 215 via a wired interface and provide the same set of services as made available through the wireless interface 220. Handset 215 has the same capabilities and supports features as handset 206 but communicates with the gateway 204 via a wired interface instead of the wireless interface that handset 206 uses to communicate with the gateway 204.

Both handset 206 and the handset 215 are described here logically and does not necessarily imply that these are restricted to only those devices that are to be held in a hand, for example, a cordless phone. Both handset 206 and the handset 215 can be an integrated component of another device, for example, computer 208, computer 207, or any other appliance such as a refrigerator, TV, etc.

Figure 3:
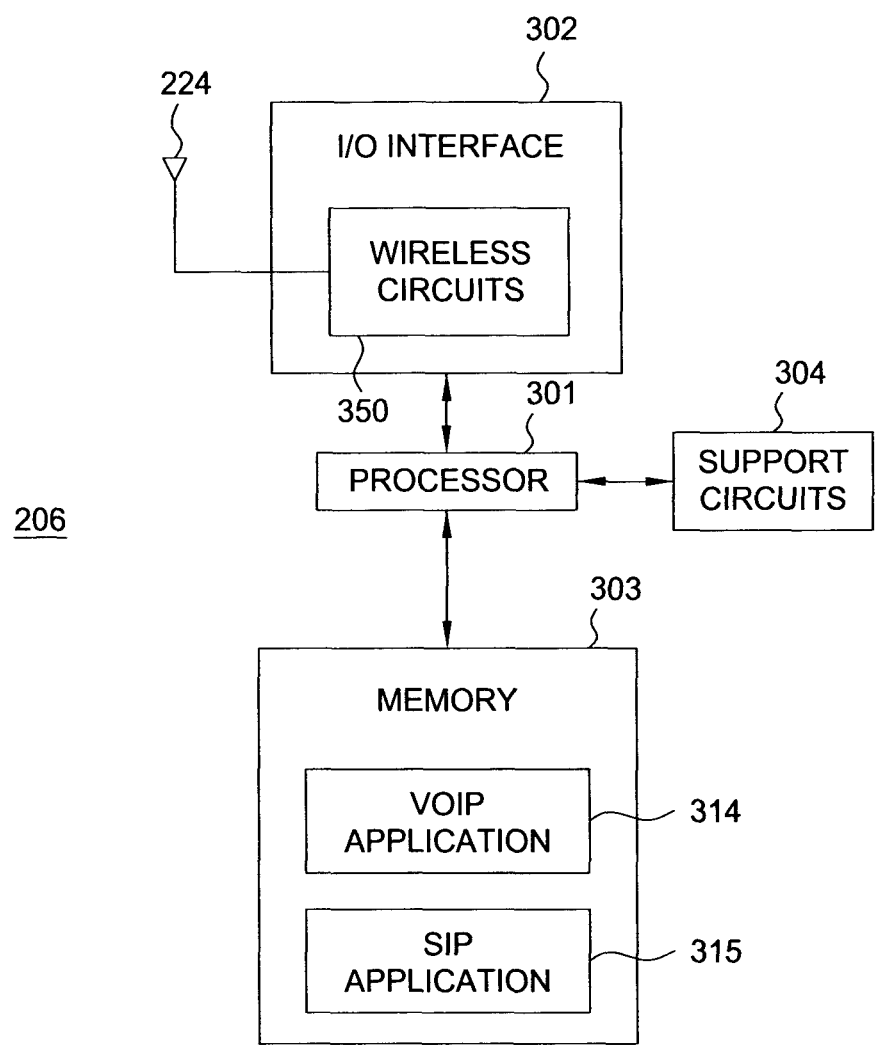
FIG. 3 is a block diagram depicting an exemplary embodiment of a handset in accordance with one or more aspects of the invention.

FIG. 3 is a block diagram depicting an exemplary embodiment of the handset 206 in accordance with one or more aspects of the invention. The handset 206 illustratively includes a processor 301, a memory 303, various support circuits 304, and an I/O interface 302. The processor 301 may be any type of microcontroller, instruction-set processor, or microprocessor known in the art. The support circuits 304 for the processor 301 may include conventional cache, power supplies, clock circuits, data registers, I/O interfaces, and the like. The I/O interface 302 may be directly coupled to the memory 303 or coupled through the processor 301. The I/O interface 302 includes wireless circuits 350 coupled to the antenna 224. The wireless circuits 350 are configured to provide wireless communication capabilities for the I/O interface 302, such as BLUETOOTH, IEEE 802.11, and the like.

The memory 303 stores processor-executable instructions and/or data that may be executed by and/or used by the processor 301 as described further below. These processor-executable instructions may comprise hardware, firmware, software, and the like, or some combination thereof. A module having processor-executable instructions that is stored in the memory 303 may include VOIP application 314 and SIP application 315. The VOIP application 314 and the SIP application 315 are configured to obtain VOIP services from the VOIP adapter 212 and SIP services from the SIP adapter 211 respectively in the gateway 204 using the wireless circuits 350 as a wireless interface or a wired interface. The memory 303 may include one or more of the following random access memory, read only memory, magneto-resistive read/write memory, optical read/write memory, cache memory, magnetic read/write memory, and the like, as well as signal-bearing media as described below. Although one or more aspects of the invention are disclosed as being implemented as processor(s) executing a software program, those skilled in the art will appreciate that the invention may be implemented in hardware, software, or a combination of hardware and software. Such implementations may include a number of processors independently executing various programs and dedicated hardware, such as ASICs.

Figure 4:
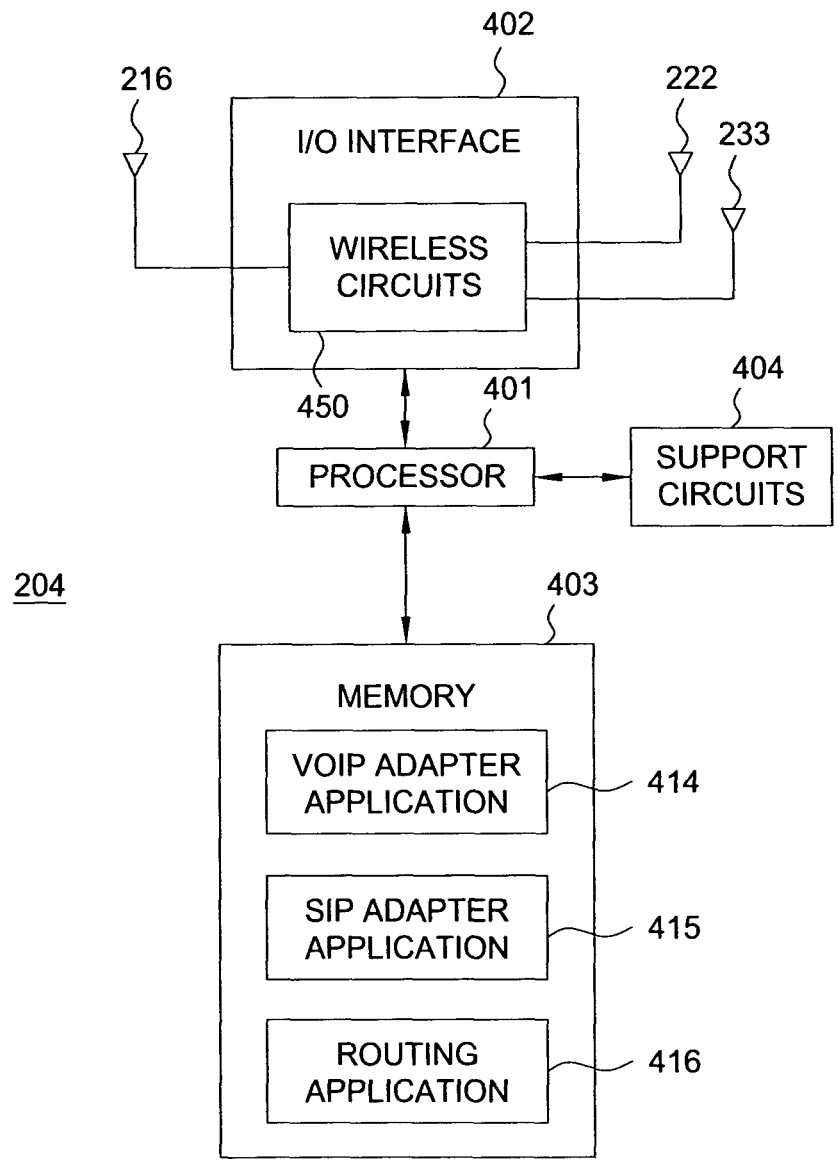
FIG. 4 is a block diagram depicting an exemplary embodiment of the gateway in accordance with one or more aspects of the invention.

FIG. 4 is a block diagram depicting an exemplary embodiment of the gateway 204 in accordance with one or more aspects of the invention. The gateway 204 includes a processor 401, a memory 403, various support circuits 404, and an I/O interface 402. The processor 401 may be any type of microcontroller, instruction-set processor, or microprocessor known in the art. The support circuits 404 for the processor 401 may include conventional cache, power supplies, clock circuits, data registers, I/O interfaces, and the like. The I/O interface 402 may be directly coupled to the memory 403 or coupled through the processor 401. The I/O interface 402 includes wireless circuits 450 coupled to the antenna 216 and the antenna 222. The wireless circuits 450 are configured to provide wireless communication capabilities for the I/O interface 402, such as BLUETOOTH, IEEE 802.11, and the like. Notably, the wireless circuits 450 may be configured to provide three separate wireless links corresponding to the LAN port 209 via the antenna 216, the VOIP adapter 212 via the antenna 222 and the SIP adapter 211 via the antenna 233.

The memory 403 stores processor-executable instructions and/or data that may be executed by and/or used by the processor 401 as described further below. These processor-executable instructions may comprise hardware, firmware, software, and the like, or some combination thereof. A module having processor-executable instructions that is stored in the memory 403 may include VOIP adapter application 414, SIP adapter application 415, and routing application 416. The VOIP adapter application 414 and SIP adapter application 415 are configured to provide VOIP services and SIP services respectively to handsets using the wireless circuits 450 as a wireless interface or a wired interface. The memory 403 may include one or more of the following random access memory, read only memory, magneto-resistive read/write memory, optical read/write memory, cache memory, magnetic read/write memory, and the like, as well as signal-bearing media as described below. Although one or more aspects of the invention are disclosed as being implemented as processor(s) executing a software program, those skilled in the art will appreciate that the invention may be implemented in hardware, software, or a combination of hardware and software. Such implementations may include a number of processors independently executing various programs and dedicated hardware, such as ASICs.

An integrated gateway has been described. In one embodiment, a gateway device includes an integrated VOIP adapter and SIP adapter for providing VOIP and SIP services respectively. A handset is configured to wirelessly communicate with the VOIP adapter to obtain the VOIP services. Since the handset is configured for wireless communication with the VOIP adapter, no phone wiring changes are necessary to use the VOIP services throughout a given location. That is, a wiring infrastructure is not required. In addition, since the VOIP adapter and the SIP adapter is integrated within a gateway device, there is no need for a separate cordless handset basestation or a separate wireless router, which reduces the cost of customer premises equipment (CPE).

While the foregoing is directed to embodiments of the present invention, other and further embodiments of the invention may be devised without departing from the basic scope thereof, and the scope thereof is determined by the claims that follow.

The invention claimed is:

1. A gateway, comprising:
a wide area network interface in communication with a packet network;
a local area network interface for coupling to a first computer via a first wired connection and to a second computer via a first wireless connection using a first antenna;
a router module for routing data traffic between the wide area network interface and the local area network interface;
a modem that is integrated within the gateway and coupled to the wide area network interface;
a voice-over-internet protocol adapter having an interface for only supporting a voice-over-internet protocol service between a first handset and the packet network, wherein the interface for the voice-over-internet protocol service comprises a second wired connection and a second wireless connection using a second antenna; and
a session-initiation protocol adapter having an interface for only supporting a session-initiation protocol service between a second handset and the packet network, wherein the interface for the session-initiation protocol service comprises a third wired connection and a third wireless connection using a third antenna, wherein a separate cordless handset base station and a separate wireless router are not needed for the voice-over-internet protocol service over the second wireless connection and the session-initiation protocol service over the third wireless connection, wherein the first handset and the second handset each comprises a voice-over-internet protocol module and a session-initiation protocol module stored in a memory, wherein the gateway comprises a single integrated device with the wide area network interface, the local area network interface, the router, the modem, the voice-over-internet protocol adapter and the session-initiation protocol adapter.

2. The gateway of claim 1, wherein the packet network comprises an internet protocol network.

3. The gateway of claim 1, wherein the voice-over-internet protocol adapter is for receiving incoming voice-over-internet protocol communications from the packet network through the wide area network interface and for providing the incoming voice-over-internet protocol communications to the first handset.

4. The gateway of claim 3, wherein the voice-over-internet protocol adapter is for receiving outgoing voice-over-internet protocol communications from the first handset and for providing the outgoing voice-over-internet protocol communications to the packet network through the wide area network interface.

5. The gateway of claim 1, wherein the session-initiation protocol adapter is for receiving incoming session-initiation protocol communications from the packet network through the wide area network interface and for providing the incoming session-initiation protocol communications to the second handset.

6. An apparatus, comprising:
a plurality of handsets; and
a gateway, including:
a wide area network interface in communication with a packet network;
a local area network interface for coupling to a first computer via a first wired connection and to a second computer via a first wireless connection using a first antenna;
a router module for routing data traffic between the wide area network interface and the local area network interface;
a modem that is integrated within the gateway and coupled to the wide area network interface;
a voice-over-internet protocol adapter having an interface for only supporting a voice-over-internet protocol service between a first handset and the packet network, wherein the interface for the voice-over-internet protocol service comprises a second wired connection and a second wireless connection using a second antenna; and
a session-initiation protocol adapter having an interface for only supporting a session-initiation protocol service between a second handset and the packet network, wherein the interface for the session-initiation protocol service comprises a third wired connection and a third wireless connection using a third antenna, wherein a separate cordless handset base station and a separate wireless router are not needed for the voice-over-internet protocol service over the second wireless connection and the session-initiation protocol service over the third wireless connection, wherein the first handset and the second handset each comprises a voice-over-internet protocol module and a session-initiation protocol module stored in a memory, wherein the gateway comprises a single integrated device with the wide area network interface, the local area network interface, the router, the modem, the voice-over-internet protocol adapter and the session-initiation protocol adapter.

7. The apparatus of claim 6, wherein the packet network comprises an Internet protocol network.

8. The apparatus of claim 6, wherein the voice-over-internet protocol adapter is for receiving incoming voice-over-internet protocol communications from the packet network through the wide area network interface and for providing the incoming voice-over-internet protocol communications to the first handset.

9. The apparatus of claim 8, wherein the voice-over-internet protocol adapter is for receiving outgoing voice-over-internet protocol communications from the first handset and for providing the outgoing voice-over-Internet protocol communications to the packet network through the wide area network interface.

10. The apparatus of claim 6, wherein the session-initiation protocol adapter is for receiving incoming session-initiation protocol communications from the packet network through the wide area network interface and for providing the incoming session-initiation protocol communications to the second handset.

11. A gateway, comprising:
- a first interface to provide communications between a wide area network and a packet network;
- a second interface having a first wired connection for a first computer and a first wireless connection using a first antenna to a second computer to provide communications with a local area network;
- a modem that is integrated within the gateway and coupled to the first interface to provide communications between the wide area network and the packet network;
- a third interface to only support a voice-over-internet protocol service between a first handset and the packet network, wherein the third interface comprise a second wired connection and a second wireless connection using a second antenna;
- a fourth interface to only support a session-initiation protocol service between a second handset and the packet network, wherein the fourth interface comprises a third wired connection and a third wireless connection using a third antenna, wherein a separate cordless handset base station and a separate wireless router are not needed for the voice-over-internet protocol service over the second wireless connection and the session-initiation protocol service over the third wireless connection, wherein the first handset and the second handset each comprises a voice-over-internet protocol module and a session-initiation protocol module stored in a memory, wherein the gateway comprises a single integrated device with the first interface, the second interface, the modem, the third interface and the fourth interface; and
- a processor; and
- a memory storing instructions, which when executed by the processor perform operations, the operations comprising:
  - routing data traffic between the first interface and the second interface.

12. The gateway of claim 11, wherein the packet network comprises an internet protocol network.

13. The gateway of claim 11, wherein the third interface to support the voice-over-internet protocol service includes:
- an interface to receive incoming voice-over-internet protocol communications from the packet network through the first interface and to provide the incoming voice-over-internet protocol communications to the first handset.

14. The gateway of claim 11, wherein the third interface to support the session-initiation protocol communications includes:
- an interface to receive incoming session-initiation protocol communications from the packet network through the first interface and to provide the incoming session-initiation protocol communications to the second handset.

* * * * *